US010922640B2

(12) United States Patent
Sarferaz (10) Patent No.: US 10,922,640 B2
(45) Date of Patent: Feb. 16, 2021

(54) SMART TEMPLATE FOR PREDICTIVE ANALYTICS

(71) Applicant: SAP SE, Walldorf (DE)

(72) Inventor: Siar Sarferaz, Heidelberg (DE)

(73) Assignee: SAP SE, Walldorf (DE)

(*) Notice: Subject to any disclaimer, the term of this patent is extended or adjusted under 35 U.S.C. 154(b) by 1013 days.

(21) Appl. No.: 14/977,676

(22) Filed: Dec. 22, 2015

(65) Prior Publication Data

US 2017/0178014 A1    Jun. 22, 2017

(51) Int. Cl.
| | | |
|---|---|---|
| *G06N 99/00* | (2019.01) | |
| *G06N 5/02* | (2006.01) | |
| *H04W 4/02* | (2018.01) | |
| *G05B 13/04* | (2006.01) | |
| *G06F 15/00* | (2006.01) | |
| *G06F 3/048* | (2013.01) | |
| *G06Q 10/06* | (2012.01) | |

(52) U.S. Cl.
CPC .............. *G06Q 10/0637* (2013.01)

(58) Field of Classification Search
CPC ..... G06Q 10/0637; G06F 13/00; G06F 11/07; G06N 99/00; G06N 5/02; G05B 13/04
USPC ........................................ 706/1–62
See application file for complete search history.

(56) References Cited

U.S. PATENT DOCUMENTS

| | | | | |
|---|---|---|---|---|
| 10,073,589 | B1* | 9/2018 | Jesensky | G06Q 30/0269 |
| 10,254,928 | B1* | 4/2019 | Jesensky | G06F 3/0482 |
| 2012/0022916 | A1* | 1/2012 | Todd | G06Q 30/02 705/7.31 |
| 2012/0226645 | A1* | 9/2012 | O'Rourke | G06Q 40/06 706/46 |
| 2014/0358825 | A1* | 12/2014 | Phillipps | G06N 20/00 706/11 |
| 2015/0339572 | A1* | 11/2015 | Achin | G06N 5/02 706/46 |
| 2015/0379429 | A1* | 12/2015 | Lee | G09B 5/00 706/11 |
| 2016/0034544 | A1* | 2/2016 | Ramanujan | G06F 16/248 707/722 |
| 2017/0010931 | A1* | 1/2017 | Agarwal | G06F 11/079 |

* cited by examiner

*Primary Examiner* — Brandon S Cole
(74) *Attorney, Agent, or Firm* — Klarquist Sparkman, LLP (57) ABSTRACT

A framework for improving user interfaces, and in particular for improving user interfaces for displaying and interacting with predictive analytics, is described herein. In one embodiment, a user interface template renders predictive models and enables visually interacting with data to discover hidden insights and relationships in the data. The user interface template determines, based on the metadata and data annotations, how to display the supplied data. By encapsulating complex code necessary to render predictive models and enable visually interacting with data, the amount of frontend code required to implement predictive analytic functionality is reduced, defect rates are reduced, while design consistency is improved.

20 Claims, 6 Drawing Sheets

```
@AbapCatalog.sqlViewName: 'CCostCenterPrQ'
@EndUserText.label: 'Cost Center Prediction Query'
@VDM.viewType: #CONSUMPTION
@Analytics.query:true
@OData.publish: true                                    402
@AccessControl.authorizationCheck:#CHECK
@UI.chart:[{chartType:#LINE, measures:['Costs'], dimensions:['Period']}]

define view C_CostCenterPredictionQuery
 with parameters parameter_CostCenterHiearchy : String
 as select from I_CostCenterPredictionView {

// Filters
  @Consumption.filter : { selectionType : #SINGLE, multipleSelections :
     false, mandatory: true}
  I_CostCenterPredictionView.CompanyCode,
  @Consumption.filter : { selectionType : #SINGLE, multipleSelections :
     false, mandatory: true}
  I_CostCenterPredictionView.FiscalYear,
  @Consumption.filter : { selectionType : #SINGLE, multipleSelections :
     false, mandatory: true} I_CostCenterPredictionView.Account, // Hiearchy
     @AnalyticsDetails.query : {
        displayHierarchy: #ON,
        hierarchyBinding :
     [ { type : #CONSTANT, value : 'SP-1000' },
     { type : #PARAMETER, value : 'parameter_CostCenterHiearchy' }]
  }

// Attributes
  @EndUserText.label : 'Account'
  @AnalyticsDetails : { query: {axis:
  #COLUMNS}}
  I_CostCenterPredictionView.Account, @EndUserText.label : 'Description'
  @AnalyticsDetails : { query: {axis:
  #COLUMNS}}
  I_CostCenterPredictionView.Description, @EndUserText.label : 'Time'
  @AnalyticsDetails : { query: {axis:
  #COLUMNS}} I_CostCenterPredictionView.Period, @EndUserText.label : 'Costs'
  @AnalyticsDetails : { query: {axis:
  #COLUMNS}} I_CostCenterPredictionView.Costs, @EndUserText.label : 'Quality'
  @AnalyticsDetails : { query: {axis: #COLUMNS}}
  I_CostCenterPredictionView.Quality
```

```
@ClientDependent:false
@EndUserText.label: 'Prediction of Cost Center Costs'
@VDM:{viewType:#BASIC, private:false}
@Analytics:{dataCategory:#FACT , dataExtraction.enabled:false } define table function I_CostCenterPredictionView
 with parameters
   @EndUserText.label:
   'Cost Center'
   p_CostCenter :
   abap.char(40),
   @EndUserText.label: 'Start Year' p_StartYear : abap.char(4)
 returns {
   // Attributes
   @EndUserText.label : 'Account'
   key Account :  abap.char(40);
   @EndUserText.label : 'Description'

Description : abap.char(100);
   @EndUserText.label : 'Time'
   Period : abap.dats;
   @EndUserText.label :
   'Costs' Costs :
   abap.int8;
   @EndUserText.label :
   'Quality' Quality :
   abap.int8;
}
implemented by method TF_CostCenterPrediction_CLASS=>predictCosts;
```

SMART TEMPLATE FOR PREDICTIVE ANALYTICS

BACKGROUND

Complicated software systems are challenging to develop and maintain. As different modules of a software system are implemented, a given piece of functionality may be implemented multiple times, often by different individuals or organizations. Different implementations are problematic, as inconsistent user experiences, increased defect rates, higher development costs, and increased maintenance costs all negatively impact the project.

Predictive analytics is a particularly complicated scenario that is challenging to implement correctly and consistently. Predictive analytics encompasses a variety of statistical techniques and data mining solutions. Examples of such statistical models include descriptive models, which classify customers or prospects into groups; decision models, which predict the results of decision involving many variables; and predictive models generally, which analyze historical data to determine how likely a specific behavior is to be expected. Example uses of predictive models include forecasting, key influencer determination, trend identification, relationship analysis, and anomaly identification.

Therefore, there is a need for an improved framework that addresses the abovementioned challenges.

SUMMARY

The disclosed user interface templates define user interface patterns and components that render a user interface at run-time based on an interpretation of metadata and/or data annotations. In one embodiment, metadata and data annotations are stored in data service views in line with or adjacent to data query commands. Data query commands may be defined in any programming language, but are particularly suited to data centric languages such as Structured Query Language (SQL). Data service views may be translated into native database views, such as a SQL view, for execution by a database. Another type of data service view, which also is associated with metadata, initiates and then returns the result of a predictive analytics operation. Metadata consumed by the disclosed user interface templates may also be obtained from web services such as Open Data protocol (OData) or other Representation State Transfer (REST) web services, configuration files, and the like.

In one embodiment, a user interface template renders predictive models and enables visually interacting with data to discover hidden insights and relationships in the data. The user interface template determines, based on the metadata and data annotations, how to display the supplied data. By encapsulating complex code necessary to render predictive models and enable visually interacting with data, the amount of frontend code required to implement predictive analytic functionality is reduced, defect rates are reduced, while design consistency is improved.

With these and other advantages and features that will become hereinafter apparent, further information may be obtained by reference to the following detailed description and appended claims, and to the figures attached hereto.

BRIEF DESCRIPTION OF THE DRAWINGS

Some embodiments are illustrated in the accompanying figures, in which like reference numerals designate like parts, and wherein:

FIG. 4 is a source code and metadata listing of a data service prediction query view;

DETAILED DESCRIPTION

In the following description, for purposes of explanation, specific numbers, materials and configurations are set forth in order to provide a thorough understanding of the present frameworks and methods and in order to meet statutory written description, enablement, and best-mode requirements. However, it will be apparent to one skilled in the art that the present frameworks and methods may be practiced without the specific exemplary details. In other instances, well-known features are omitted or simplified to clarify the description of the exemplary implementations of the present framework and methods, and to thereby better explain the present framework and methods. Furthermore, for ease of understanding, certain method steps are delineated as separate steps; however, these separately delineated steps should not be construed as necessarily order dependent in their performance.

Figure 1:
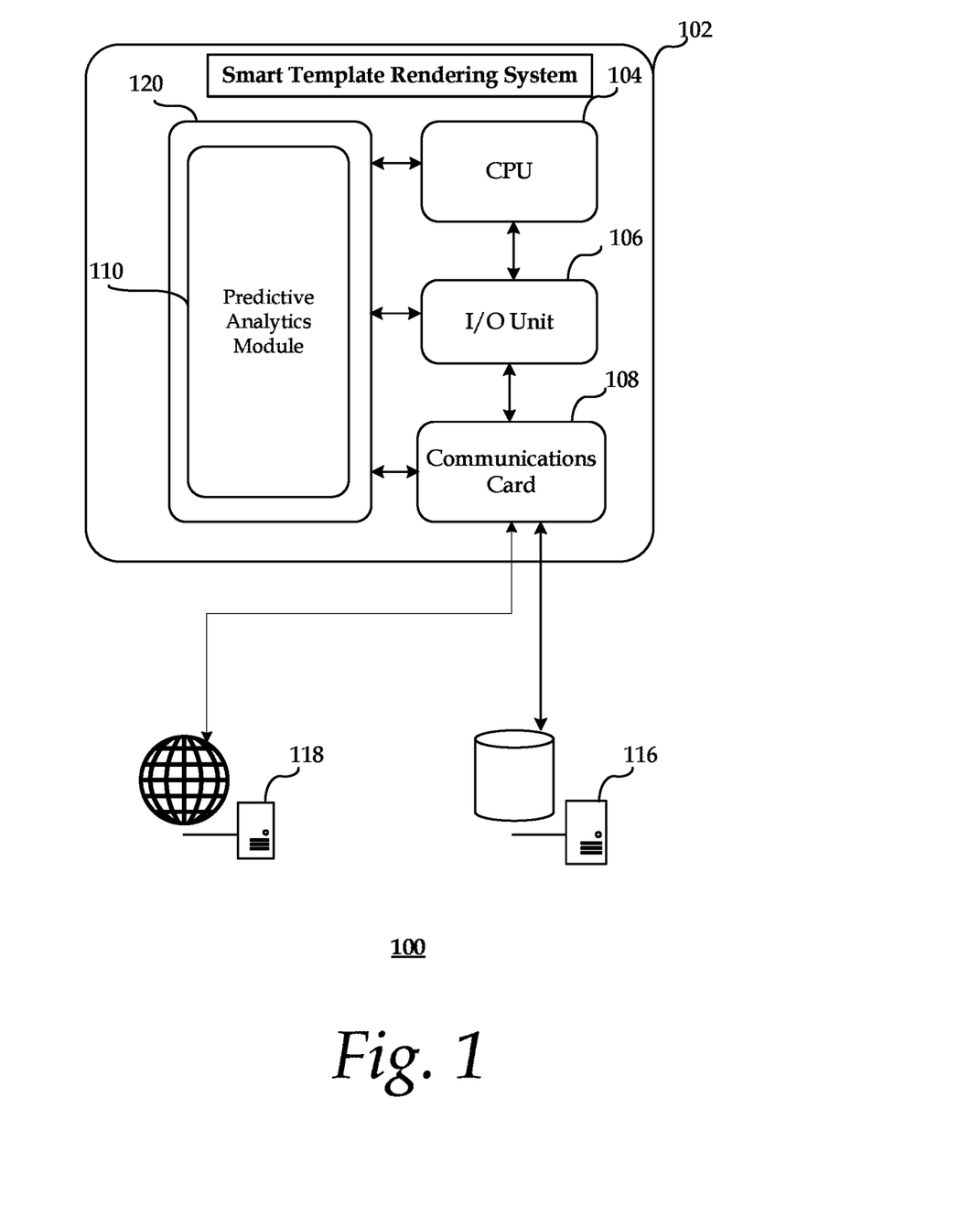
FIG. 1 is a block diagram illustrating an exemplary architecture.

FIG. 1 is a block diagram illustrating an exemplary architecture 100 that may be used to implement the predictive analytics user interface template described herein. Generally, architecture 100 may include a template for predictive analytics system 102, a data repository 116, and a business logic server 118.

The template for predictive analytics system 102 can be any type of computing device capable of responding to and executing instructions in a defined manner, such as a workstation, a server, a portable laptop computer, another portable device, a touch-based tablet, a smart phone, a minicomputer, a mainframe computer, a storage system, a dedicated digital appliance, a device, a component, other equipment, or a combination of these. The system may include a central processing unit (CPU) 104, an input/output (I/O) unit 106, a memory module 120 and a communications card or device 108 (e.g., modem and/or network adapter) for exchanging data with a network (e.g., local area network (LAN) or a wide area network (WAN)). It should be appreciated that the different components and sub-components of the system may be located on different machines or systems. Memory module 120 may include predictive analytics template 110.

The template for predictive analytics system 102 may be communicatively coupled to one or more other computer systems or devices via the network. For instance, the system may further be communicatively coupled to one or more data repository 116 and/or business logic server 118. The data repository 116 may be, for example, any database (e.g., relational database, in-memory database, etc.), an entity (e.g., set of related records), or a data set included in the database. In some implementations, data repository 116 stores data over which predictive analytics may be performed. Additionally or alternatively, data repository 116 may perform queries, analysis, or other processing to perform the predictive analytics.

The business logic server 118 may be a server computer, desktop computer, cloud computer, virtual computer, or any other type of computing device capable of processing network requests to store, retrieve, or process content. In one embodiment, the template for predictive analytics system 102 operates as a client computer (e.g., desktop, laptop, mobile), with which business logic server 118 communicates to perform the steps described herein.

Predictive analytics template 110 includes a logic for receiving and processing user input related to a predictive analytics template. In one embodiment, predictive analytics template 110 enables a user to select a type of predictive analytics and an entity or data set on which to perform the analysis. Predictive analytics template 110 may then invoke a data service view, either directly, or via a remoting architecture such as a web service. The data service view is associated with metadata usable by predictive analysis template 110 to determine how to layout data returned from the data service view.

Figure 2:
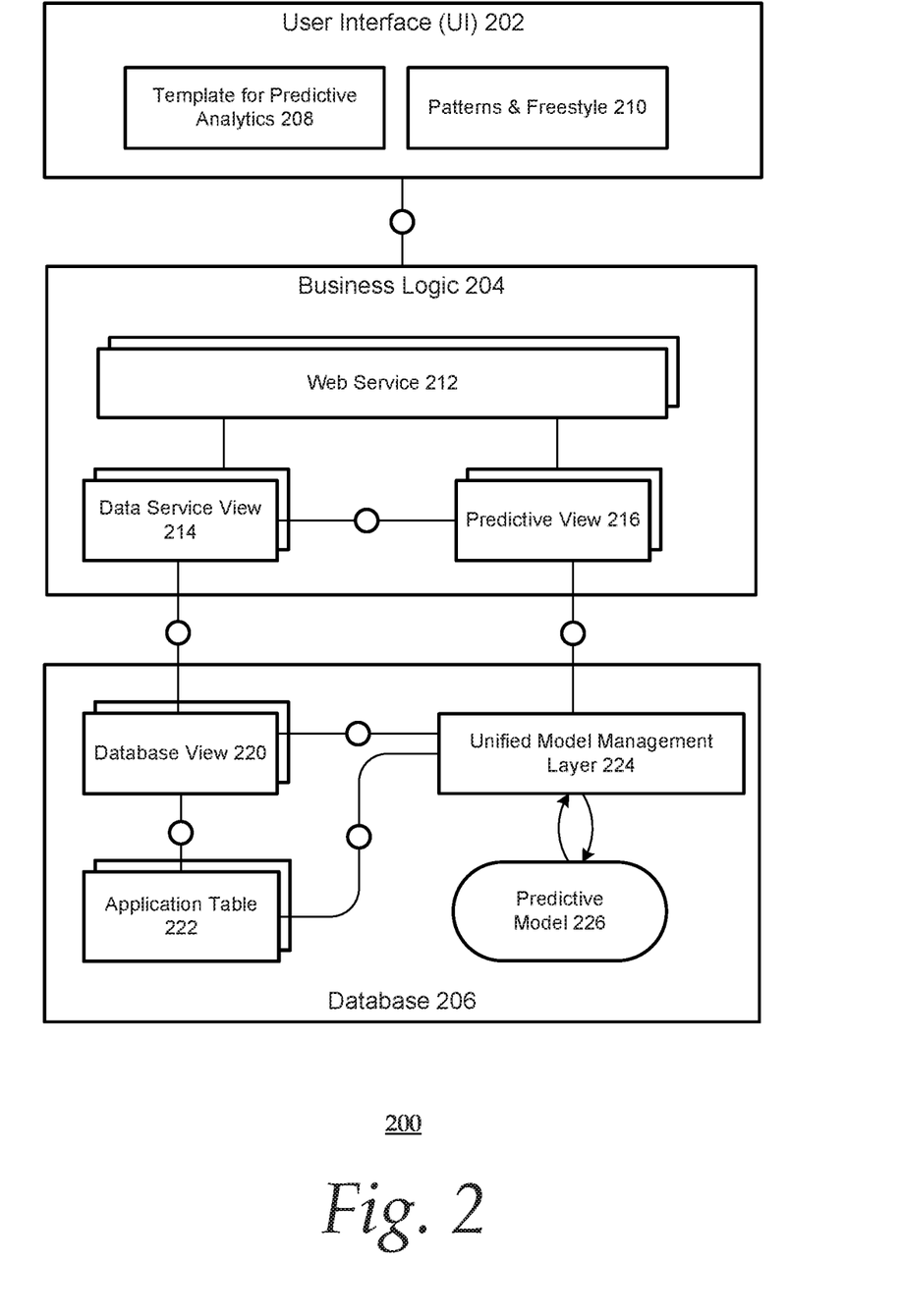
FIG. 2 is a block diagram illustrating exemplary components arranged in three software layers.

FIG. 2 is a block diagram 200 illustrating exemplary components arranged in three software layers. FIG. 2 depicts a user interface 202, which in some embodiments is implemented by the template for predictive analytics system 102. FIG. 2 also depicts business logic layer 204, which in some embodiments is implemented by business logic server 116. FIG. 2 also depicts a database layer 206, which in some embodiments is implemented by data repository 116.

User interface 202 includes a template for predictive analytics 208 and patterns & freestyle 210. Business logic 204 includes web service 112, which is used to invoke data service views and return the associated metadata and resulting data to user interface 202. In one embodiment, web service 212 is implemented in Open Data Protocol (OData), and itself makes metadata available to user interface 202, regardless of which data service view is executed.

Business logic 204 also includes data service view 214 and predictive view 216. Predictive view 216 may optionally invoke a data service view. As discussed in further detail below with regard to FIG. 6, data service view 214 and predictive view 216 expose data and metadata for consumption by user interface 202. Data service view 214 invokes a database view, such as database view 220, which in turn is based on application table 222. In some embodiments, database view 220 is created from data service view 214 by stripping metadata from data service view 214. Predictive view 216 directly invokes unified model management layer 224, which in turn invokes predictive model 226.

Figure 3:
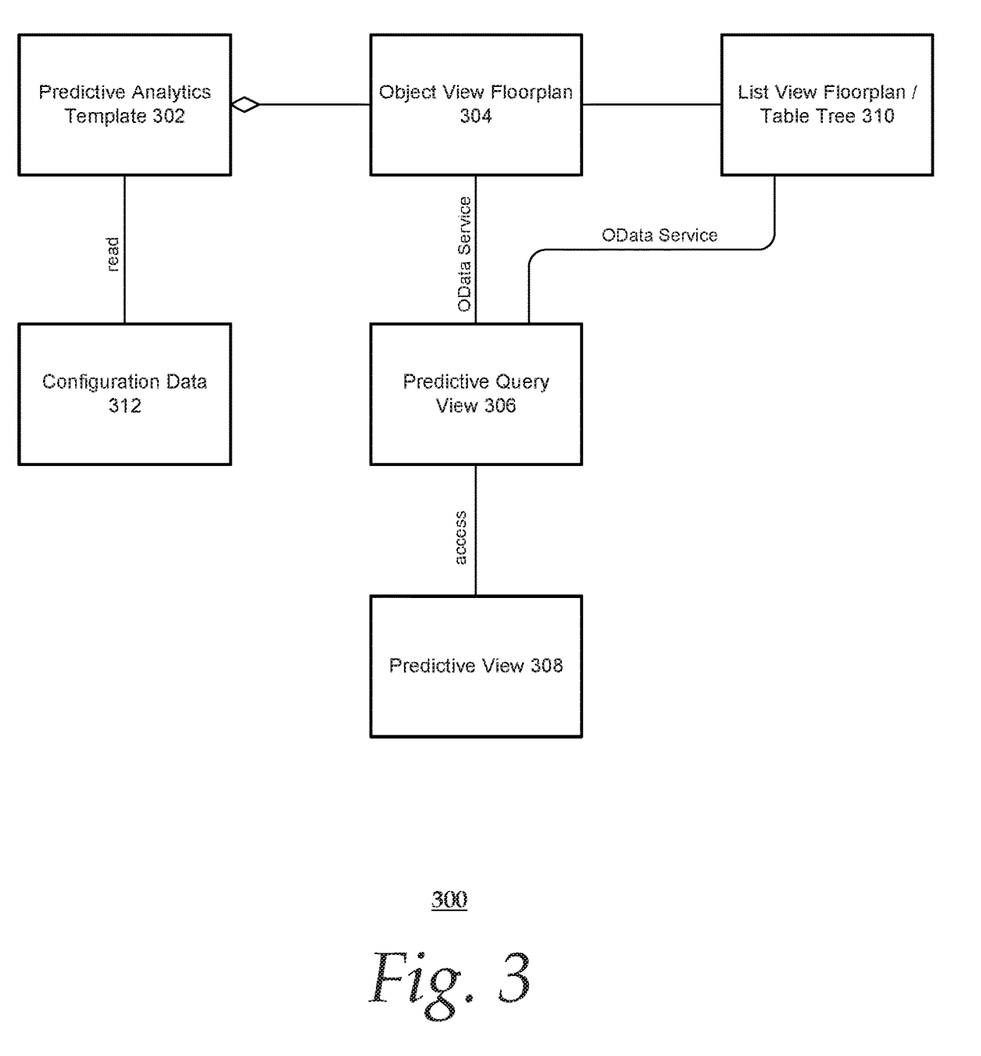
FIG. 3 is a meta model for a predictive analytics template.

FIG. 3 is a meta model 300 for a predictive analytics template. FIG. 3 depicts predictive analytics template 302, which is typically implemented by the template for predictive analytics system 102. In one embodiment, predictive analytics template 302 generates object view floorplan 304 user interface. Object view floorplan 304, in one embodiment, enables a user to select an object or a set of data upon which to execute predictive analytics.

Figure 5:
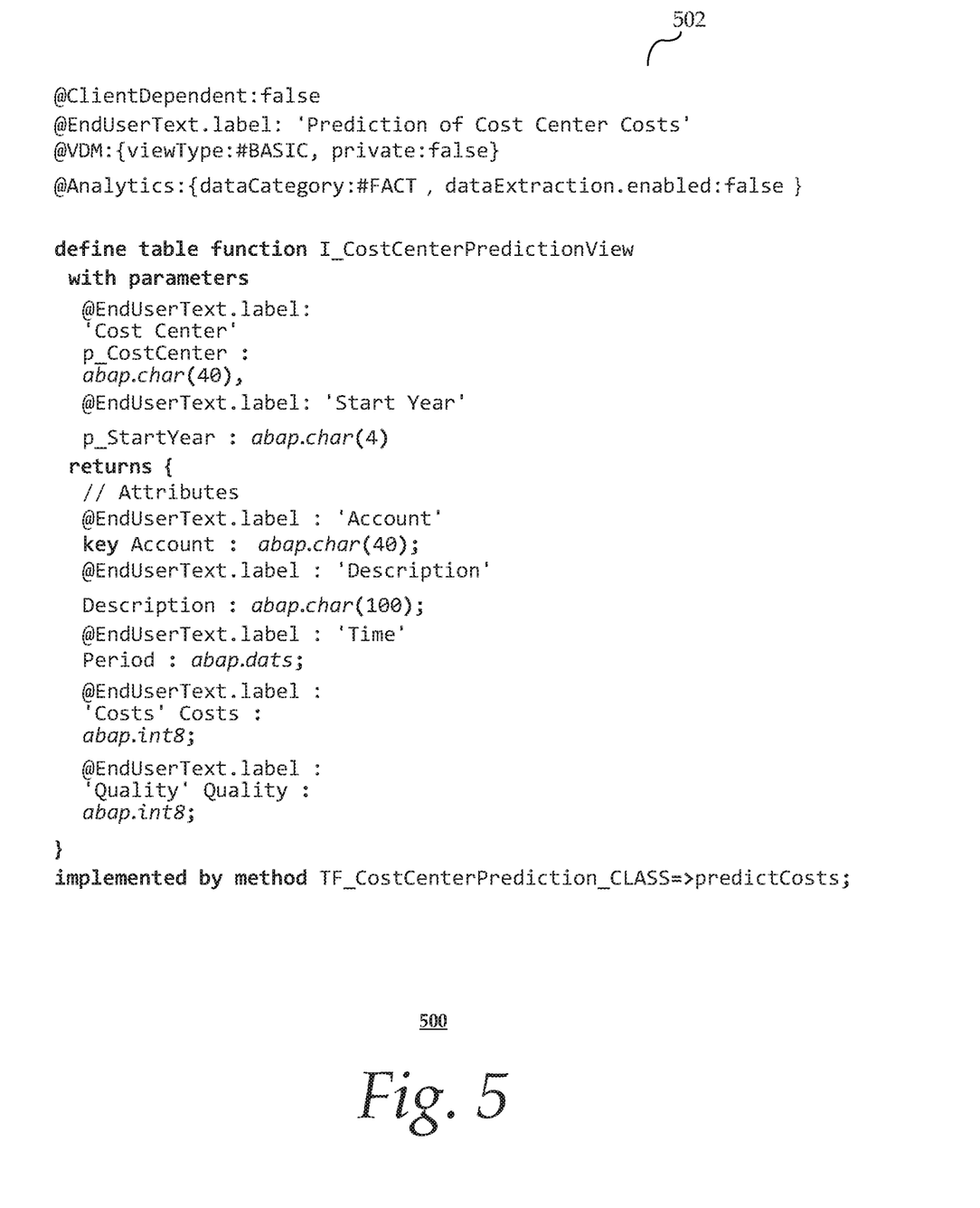
FIG. 5 is a source code and metadata listing of a data service prediction view.

Once the type of predictive analytics is selected, predictive query view 306 (example depicted in FIG. 4) is invoked, which may in turn invoke predictive view 308 (example depicted in FIG. 5). Upon completion of predictive query view 306, the data is returned, and as is any metadata associated with the predictive query view 306. This metadata is used by predictive analytics template 302 to display an interactive predictive analytics user interface. For example, predictive analytics template 302 may graph the results of the predictive analytics automatically. The type of graphs, e.g., a line graph, the range of values chosen to be graphed, a list of other graph types the user may choose to render the same data with, and the like, may be rendered based on the metadata returned by predictive query view 306 and/or predictive view 308. Additionally or alternatively, metadata may be retrieved from configuration data 312. In one embodiment, when the resulting data returned comprises a tree or other hierarchy, the data is displayed with list view table tree 310. However, if the data returned comprises a flat list, then list view floorplan 310 is used to display the data.

FIG. 4 is a source code and metadata listing 400 of a data service prediction query view 402.

FIG. 5 is a source code and metadata listing 500 of a data service prediction view 502.

Figure 6:
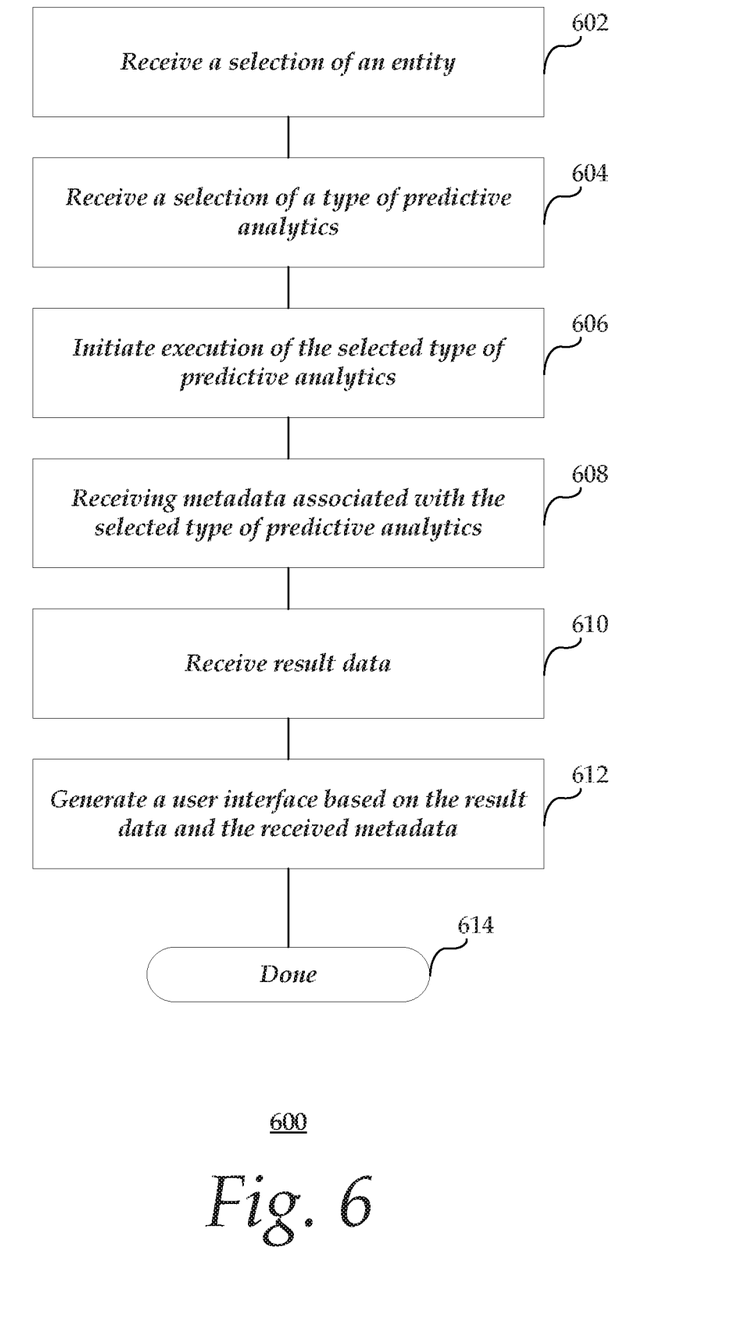
FIG. 6 is a flow chart illustrating one embodiment of generating a predictive analytics user interface.

FIG. 6 is a flow chart illustrating an exemplary process 600 invoking an action associated with generating a predictive analytics user interface. The process may be performed automatically or semi-automatically by the template for predictive analytics system 102, described above with reference to FIG. 1.

At block 602, a selection of an entity upon which to perform predictive analytics is received. For example, if a list of a business's cost centers is displayed to a user, the user may select one or more of the cost centers on which to perform predictive analytics.

At block 604, a selection of a type of predictive analytics to perform on the selected entity is received. Continuing the example, for the selected cost center, an analytic report such as "sales & presales", for predicting future costs, may be selected.

At block 606, execution of the selected type of predicted analytics for the selected entity is initiated. In one embodiment, execution is initiated by invoking a data service view, such as predictive query view 306 or data service view 214. In one embodiment, the data service view 214 or predictive query view 306 defines a result data schema and is associated with at least one piece of metadata used to determine how to layout the resulting data.

In one embodiment, a data service view includes computer code, whether interpreted or compiled, and metadata. The associated metadata may be global to the data service view or adjacent to a particular lines) of computer code. In one embodiment, a data service view 214 is a wrapper around a relational database view, in that invoking the data service view in turn invokes an underlying relational database view. This underlying relational database view may be a SQL view, meaning a live projection of data from one or more tables into a queryable form. In one embodiment, the relational database view is generated from the data service view by stripping out the metadata associated with the data service view.

In another embodiment, the data service view includes a predictive view, such as predictive view 216, which when executed wraps execution of a predictive analytics module. In one embodiment, the predictive analytics module executes within a database where the data being analyzed is located, eliminating unnecessary data marshaling and remoting overhead.

At block 608, at least one piece of metadata associated with the selected type of predictive analytics is received. In another embodiment, metadata associated with the template is obtained from a configuration file, e.g., configuration data 312, directly from the configuration file or from service and annotation URLs contained within the configuration file. Additionally or alternatively, metadata may be retrieved from configuration tables in data repository 116.

At block 610, a data result is received. In one embodiment, the received data results include the result of executing the data service view, and conforms to the result data schema.

At block 612, the received result data and the received metadata are used to generate an interactive user interface displaying the results of executing the predictive analytics on the selected data set.

At block 614, the process 600 ends.

What is claimed is:

1. A computer-implemented method comprising:
receiving a selection of a selected entity upon which to perform predictive analytics;
receiving a selection of a selected type of predictive analytics to perform on the selected entity;
initiating execution of the selected type of predictive analytics by invoking a data service view, wherein the data service view defines a result data schema, the data service view comprising instructions for retrieving data from one or more database tables, the data service view further comprising display metadata defining at least in part a user interface and associated with the selected type of predictive analytics;
receiving, as a result of the initiating execution, at least a portion of the display metadata, wherein the at least a portion of the display metadata identifies at least in part a user interface layout for arranging the user interface, the user interface comprising one or more components, the at least a portion of the display metadata specifying one or more elements selected from the group consisting of one or more labels for at least one of the one or more components in the user interface, a graph type, a list of graphs types in which result data may be displayed, and a range of values to be graphed;
receiving, as a result of the initiating execution, the result data associated with the result data schema; and
generating the user interface based at least in part on the at least a portion of the display metadata and the result data schema, wherein the user interface is arranged at least in part based on the user interface layout and comprises at least a portion of the result data.

2. The computer-implemented method of claim 1, wherein the display metadata is specified as an annotation to the data service view.

3. The computer-implemented method of claim 1, wherein the selected type of predictive analytics comprises a statistical algorithm for exponential smoothing.

4. The computer-implemented method of claim 1, wherein the data service view is translated into a relational database view, wherein invoking the data service view causes the relational database view to be invoked.

5. The computer-implemented method of claim 4, wherein the relational database view invokes a relational database function.

6. The computer-implemented method of claim 1, further comprising:
receiving a user input modifying an aspect of the user interface layout specified by the at least a portion of the display metadata.

7. The computer implemented method of claim 1, wherein at least another portion of the display metadata is retrieved from a configuration file or a web services descriptor.

8. A computing apparatus facilitating generating a predictive analytics user interface, the computing apparatus comprising:
a processor; and
a memory storing instructions that, when executed by the processor, configure the apparatus to perform operations comprising operations to:
receive a selection of a selected entity upon which to perform predictive analytics;
receive a selection of a selected type of predictive analytics to perform on the selected entity;
initiate execution of the selected type of predictive analytics by invoking a data service view, wherein the data service view defines a result data schema of the predictive analytics, the data service view comprising instructions for retrieving data from one or more database tables, the data service view further comprising display metadata defining at least in part a user interface;
receive, as a result of the execution, at least a portion of the display metadata, wherein the at least a portion of the display metadata defines at least a portion of the user interface displaying result data of the predictive analytics and identifies at least in part a user interface layout for the at least a portion of the user interface, the user interface comprising one or more components, the at least a portion of the display metadata specifying one or more elements selected from the group consisting of one or more labels for at least one of the one or more components in the user interface, a type of graph for rendering the result data, a list of graph types in which result data may be displayed, and a range of values to be graphed;
receive, as a result of the execution, the result data associated with the result data schema; and
generate the user interface at least in part via the at least a portion of the display metadata, wherein the user interface is arranged at least in part based on the user interface layout identified by the at least a portion of the display metadata and comprises at least a portion of the result data.

9. The computing apparatus of claim 8, wherein the display metadata is specified as an annotation to the data service view.

10. The computing apparatus of claim 8, wherein the selected type of predictive analytics comprises a statistical algorithm for exponential smoothing.

11. The computing apparatus of claim 8, wherein the data service view is translated into a relational database view, wherein invoking the data service view causes the relational database view to be invoked.

12. The computing apparatus of claim 11, wherein the relational database view invokes a relational database function.

13. The computing apparatus of claim 8, further comprising:
receiving a user input modifying an aspect of the user interface layout specified by the at least a portion of the display metadata.

14. The computing apparatus of claim 8, wherein at least another portion of the display metadata is retrieved from a configuration file or a web services descriptor.

15. A non-transitory computer-readable storage medium facilitating generating a predictive analytics user interface, the computer-readable storage medium including instructions that when executed by a computer, cause the computer to:
receive a selection of a selected entity upon which to perform predictive analytics;
receive a selection of a selected type of predictive analytics to perform on the selected entity;

initiate execution of the selected type of predictive analytics by invoking a data service view, wherein the data service view defines a result data schema and comprises display metadata, the data service view comprising instructions for retrieving data from one or more database tables, the display metadata defining at least in part a user interface;

receive, as a result of the execution, result data associated with the result data schema and at least a portion of the display metadata, wherein the at least a portion of the display metadata identifies at least in part a user interface layout for arranging the user interface, the user interface comprising one or more components, the at least a portion of the display metadata specifying one or more elements selected from the group consisting of one or more labels for one or more components in the user interface, a graph type, a list of graph types in which result data may be displayed, and a range of values to be graphed; and generate the user interface based at least in part on the at least a portion of the display metadata, wherein the user interface is arranged at least in part according to the user interface layout identified by the at least a portion of the display metadata and at least portion of the result data.

16. The non-transitory computer-readable storage medium of claim 15, wherein the display metadata is specified as an annotation to the data service view.

17. The non-transitory computer-readable storage medium of claim 15, wherein the data service view is translated into a relational database view, wherein invoking the data service view causes the relational database view to be invoked.

18. The non-transitory computer-readable storage medium of claim 17, wherein the relational database view invokes a relational database function.

19. The non-transitory computer-readable storage medium of claim 15, further comprising:
receiving a user input modifying an aspect of the user interface layout specified by the at least a portion of the display metadata.

20. The non-transitory computer-readable storage medium of claim 15, wherein at least another portion of the display metadata is retrieved from a configuration file or a web services descriptor.

\* \* \* \* \*